United States Patent Office 2,906,725
Patented Sept. 29, 1959

2,906,725

SYNTHETIC POLYMER COMPOSITIONS WITH IM-
PROVED PHYSICAL PROPERTIES FROM MIX-
TURES OF RUBBERY POLYMERS

John R. Briggs, Westfield, and Robert L. Zapp, Florham
Park, N.J., assignors to Esso Research and Engineer-
ing Company, a corporation of Delaware No Drawing. Application October 12, 1955
Serial No. 540,157

6 Claims. (Cl. 260—45.5)

The present invention relates to improved synthetic polymer compositions and particularly to mixtures of simple isoolefinic polymers with sulfurizable, curable interpolymers of an iso-olefin and a diolefin. More specifically, the invention pertains to mixtures of high molecular weight isobutylene polymers with Butyl rubber, which have greatly improved tensile strength and abrasion resistance coupled with excellent extensibility characteristics adequate for the manufacture of tire treads.

Neither polyisobutylene alone nor Butyl rubber alone have been extensively used heretofore in the manufacture of tire treads. Polyisobutylene, though rubbery in character, shows the property of cold flow and has low tensile strength because it is not readily vulcanized. Butyl rubber, on the other hand, can be readily vulcanized eliminating cold flow and yielding excellent tensile strength and elasticity. However, a further increase in the extensibility of Butyl rubber vulcanizates and further improvements in its abrasion resistance are still being sought, particularly to enhance its utility for tire tread purposes. The polymer mixtures of the present invention afford such improvements.

Prior to the present invention, mixtures of polyisobutylene with Butyl rubber type copolymers have been described for various purposes. For example, U.S. Patent No. 2,392,847 describes mixtures of polyisobutylene of a wide range of molecular weights with isobutylene-diolefin copolymers of the Butyl rubber type, in various proportions, being free of cold flow and having good tensile strength, abrasion resistance, and elongation and, most of all, high resistance to chemical influences including oxygen, ozone and oxidizing chemicals as well as alkalies, acids and salts. These polymer mixtures which have actually been prepared from polyisobutylene of up to 200,000 Staudinger molecular weight and from isobutylene-butadiene copolymers of the Butyl rubber type have excellent utility for purposes of insulation, as proofing, covering and protecting agents for fabrics including cloth, paper, felt, cellophane and other laminar materials. However, the tensile strength, elongation and particularly the abrasion resistance of these mixtures have been found insufficient for the manufacture of tire treads in competition with those manufactured from natural rubber or synthetic rubbers of the butadiene-styrene copolymer type. The present invention overcomes this drawback and affords various other advantages as will appear hereinafter.

It has now been found that a synthetic rubber of excellent tire tread utility is obtained when unvulcanized isobutylene-isoprene copolymer having about 45,000–60,000 Staudinger molecular weight is mixed with about 20–50% by weight based on total mixture, of polyisobutylene of 250,000–300,000 Staudinger molecular weight and the mixture is compounded and vulcanized with sulfur and conventional vulcanization aids. Mixtures of this type exhibit higher tensile strength and elongation and, most of all, considerably higher abrasion resistance as compared to both the mixture components as such and prior art Butyl rubber-polyisobutylene mixtures. One possible reason for this unexpected superiority may be found in the unique properties of the high molecular weight polyisobutylene employed which, when molded into a sheet, presents many of the properties of a vulcanized network displaying at room temperature high elasticity and strength as well as a high degree of dimensional stability. It is also interesting to note that mixtures of this high molecular weight polyisobutylene with butadiene-based Butyl rubber are inferior to the mixtures of the present invention in some important respects, such as ultimate tensile strengths. The use of Butyl rubber of the isobutylene-isoprene type is, therefore, essential for the purposes of the present invention.

The components of the mixture of the present invention may be prepared by any method known in the art. There is nothing particularly critical in the preparation of the Butyl rubber component and such conventional methods as described in U.S. Patents Nos. 2,356,128, 2,392,847 and many others may be readily applied to the needs of the present invention. These methods involve the low temperature polymerization of mixtures of isobutylene with isoprene by a low temperature polymerization procedure utilizing as the catalyst a solution of aluminum chloride in a low freezing solvent such as ethyl or methyl chloride or carbon disulfide at temperatures ranging from $-10°$ to $-100°$ C. or $-150°$ C. or lower, the preferred range being from $-40°$ to $-100°$ C., the preferred ratio of reactants being from 70 parts to 99 parts of the iso-olefin with 30 parts to 1 part of the diolefin. The resulting interpolymer should have a molecular weight between about 45,000 and 60,000 and preferably contains approximately 1% of diolefin molecules with 99% of iso-olefin molecules. When so prepared, the material has the very valuable property of being curable with sulfur, especially in the presence of an organic polysulfide of the type of "Tuads" (tetramethyl thiuram disulfide) or "Butyl Zimate" (zinc dimethyl dithiocarbamate). The above described material has an iodine number preferably within the range of 1–40; and is a plastic, elastic material characterized by sufficient flow to fill a mold upon heating, and after heating in the presence of sulfur; it is characterized by a tensile strength ranging from 2,500–4,600 pounds per square inch and an elongation at break ranging from 500–1200%.

Polyisobutylene is usually prepared by liquefying and cooling isobutylene to a convenient low temperature ranging from $0°$ C. to approximately $-100°$ C. or lower if desired, and treating with gaseous boron trifluoride. The polymers so prepared may have molecular weights as high as 120,000 and even up to 200,000 Staudinger.

However, to make very high molecular weight polyisobutylene having a Staudinger molecular weight above 180,000 and particularly 250,000–300,000 as it is required for the present invention, a different technique has been found desirable. This technique involves polymerizing in 1–10 volumes of methyl chloride or other lower halo-alkane, and, of course, at a much lower temperature, i.e. about $-100°$ to $-160°$ F., using a strong catalyst such as $AlCl_3$ dissolved in methyl chloride in a very low concentration, preferably below 0.02 wt.

percent, e.g. 0.001–0.01 wt. percent. High purity isobutylene, i.e. at least 99% pure is used, which preferably contains not more than 0.5% n-butenes and which is free of di-isobutylene. Conversion is preferably held at a level below 70%, say at about 50–60%. This polymerization can conveniently be carried out in a commercial plant of the same type as is used for making the Butyl rubber component of the mixture of the invention.

The two components of the mixture of the invention may be mixed together in any convenient manner, such as by milling on an open roll mill, by treatment in a Banbury type mill, by kneading together, or by mixing solutions of the respective substances in a convenient solvent, and separating the mixed polymers from the solvent by evaporation of the solvent or by precipitation by means of an organic liquid such as an alcohol, ether or ketone.

The mixture is then admixed with sulfur and a sulfurization aid, and, if desired, with stearic acid and/or zinc oxide as supplemental constituents. Also, the mixture may contain any of the usual inert pigments or fillers or both. Carbon black and particularly channel black in proportions of about 25–40% by weight of total mixture is an extremely valuable ingredient of the mixtures in accordance with the present invention. The mixture so compounded is then subjected to vulcanization by heating at 250°–400° F. for 120 to 5 minutes, the heating time being the shorter the higher the temperature within the ranges specified.

The proportion of sulfur is desirably from 0.5–6%, preferably 1–3%, of the amount of the Butyl rubber present. The stearic acid may be present in the ratio of from 1–10 parts, with from 1–10 parts of zinc oxide per 100 parts of total polymers. The curing aid or sulfurization aid is preferably present in from 0.01 to 3 parts, preferably in the ratio of 0.5–2% of the amount of Butyl rubber. The sulfurization aid may take the form of an organic polysulfide such as "Tuads" (tetramethyl thiuram disulfide) or may be one or another of a limited number of organic sulfur compounds such as the "Butyl Zimate" above-mentioned, or may be other similar substances. In addition to carbon black clay, lithopone, barytes, ferric oxide, wood flour, cotton linters, ground cork, chrome green, chrome yellow, lead sulfide, lead carbonate and similar fillers and pigments either singly or in various mixtures may be used.

The invention will be further illustrated by the following specific examples.

*Example I*

GR–I–18 (isobutylene-isoprene) Butyl rubber obtained from the Reconstruction Finance Corporation (see Sales Catalogue issued by R.F.C., Office of Snythetic Rubber, Sales Division, page I–18–1; Rev. 3–1–54) having a molecular weight of about 52,000–53,000 Staudinger was blended with a high molecular weight polyisobutylene prepared as follows:

Isobutylene of about 99.5% purity and free of di-isobutylene was polymerized at a temperature of about −140° F., using a dilute solution of AlCl$_3$ in methyl chloride as the catalyst in a concentration of about 0.01 wt. percent. Catalyst addition was controlled to adjust conversion to about 50–60%. The polyisobutylene obtained had the following properties:

Molecular weight, Staudinger _____ 289,000
Tensile strength, lbs./sq. in _____ 2,450
Elongation, percent _____ 910

The two polymers so prepared were mixed in varying proportions, compounded and vulcanized at 307° F. for 40 minutes in a steam heated press with various vulcanization ingredients. The rubber mixtures so obtained were tested for their essential physical properties. The composition and properties of these mixtures are tabulated below (amounts in parts by weight).

| Mixture No | 1 | 2 | 3 | 4 |
|---|---|---|---|---|
| GR–I–18 | 50 | 60 | 75 | 100 |
| HM polyisobutylene | 50 | 40 | 25 | |
| MPC channel black | 40 | 40 | 40 | 40 |
| Zinc oxide | 5 | 5 | 5 | 5 |
| Sulfur | 1 | 1.2 | 1.5 | 2 |
| Tuads | 1.2 | 1.2 | 1.2 | 1.2 |
| Oil [1] | 5 | 5 | 5 | 5 |
| 40″ cure, 307° F.: | | | | |
| Tensile | 2,530 | 2,660 | 3,150 | 3,000 |
| Modulus, 300% | 520 | 600 | 830 | 1,200 |
| Elongation, percent | 700 | 680 | 670 | 560 |
| Dyn. modulus dynes/cm.$^2$×10$^{-7}$ [2] | 3.3 | 3.6 | 3.5 | 4.0 |
| Abrasion loss 20% Slip, cc./km./amp.[3] | .04 | 0.14 | 0.19 | 0.35 |

[1] Conventionally refined Mid-Continent oil of about 40 SUS viscosity at 210° F.
[2] Dynamic modulus test conducted at 16 cycles per second. Test piece, 3″ x 0.25″ x 0.75″, is given a static extension of 10% with a superimposed dynamic extension of 10%. Modulus is a Young's modulus, i.e., a ratio of stress over strain.
[3] In this test a 1¾″ sample wheel drives an abrasion wheel provided with controlled resistance to rotation resulting in a slip between the peripheral speeds of the two wheels. Resistance is altered to give a constant degree of slip. Abrasion loss is determined after a certain distance of travel and expressed as volume loss (cc.) per kilometer (km.) per unit of breaking force (amp.)—"Abrasion of Butyl Rubber," R. L. Lapp, October 1955, issue of "Rubber World."

It will be noted that the mixtures of the present invention (Nos. 1–3) are far superior to Butyl rubber alone (No. 4) with respect to both abrasion resistance and elongation. Mixture No. 3 surpasses Butyl rubber even in tensile strength. A similar superiority exists over prior art mixtures of polyisobutylene with Butyl rubber. This superiority is highly valuable for tire tread manufacture and in other applications were scuffing occurs, such as window seals, brake pedals, etc.

The invention is not limited to the specific figures of the foregoing examples. The relative proportions of the materials used and the reaction conditions may be varied within the limits indicated in the specification to obtain products of varying characteristics.

What is claimed is:

1. An improved abrasion resistant composition comprising a mixture of about 50–80% by weight of a rubbery copolymer consisting of about 70 to 99 parts by weight of copolymerized isobutylene and about 30 to 1 parts by weight of copolymerized isoprene, said copolymer having been prepared in the presence of an aluminum chloride solution at a temperature between about −10° and −150° C., with about 20 to 50% by weight of polyisobutylene having a Staudinger molecular weight of between about 250,000 and 300,000, said polyisobutylene having been prepared in the presence of an aluminum chloride solution at a temperature between about −100° and −160° F., said composition having been vulcanized in the presence of added curatives at a temperature of about 250° to 400° F. for about 5 to 120 minutes.

2. A tire having an improved abrasion resistant tread portion containing a composition which comprises a mixture of about 50–80% by weight of a rubbery copolymer consisting of about 70 to 99 parts by weight of copolymerized isobutylene and about 30 to 1 parts by weight of copolymerized isoprene, said copolymer having been prepared in the presence of an aluminum chloride solution at a temperature between about −10° and −150° C. with about 20 to 50% by weight of polyisobutylene having a Staudinger molecular weight of between about 250,000 and 300,000, said polyisobutylene having been prepared in the presence of an aluminum chloride solution at a temperature between about −100° and −160° F., said composition having been vulcanized in the presence of added curatives at a temperature of about 250° to 400° F. for a time of about 5 to 120 minutes.

3. A tire having an improved abrasion resistant tread portion according to claim 2 in which the copolymer of said tread portion has a Staudinger molecular weight between about 45,000 and 60,000.

4. A tire having an improved abrasion resistant tread portion according to claim 2 in which the copolymer of said tread portion contains about 99 parts by weight of copolymerized isobutylene and about 1 part by weight of copolymerized isoprene, the polyisobutylene having a Staudinger molecular weight of about 290,000.

5. A tire having an improved abrasion resistant tread portion in which the tread portion contains a composition comprising a mixture of about 50 to 75% by weight of a rubbery copolymer consisting of about 70 to 99 parts by weight of copolymerized isobutylene and about 30 to 1 parts by weight of copolymerized isoprene, said copolymer having been prepared in the presence of an aluminum chloride solution in methyl chloride at a temperature of between about −40° to −100° C., said copolymer having a Staudinger molecular weight of between about 50,000 and 60,000 with about 25 to 50% by weight of polyisobutylene having a Staudinger molecular weight of about 289,000, said polyisobutylene having been prepared in the presence of an aluminum chloride solution in methyl chloride at a temperature of between about −100° and −160° F., said mixture having been vulcanized in the presence of channel black, zinc oxide, sulfur and tetramethyl thiuram disulfide at a temperature level between about 250° and 400° F. for between about 5 and 120 minutes.

6. A tire having an improved abrasion resistant tread portion according to claim 5 in which the composition of the tread portion contains about 40 to 50 parts by weight of polyisobutylene, about 50 to 60 parts by weight of rubbery copolymer and about 1 to 1.5 parts by weight of sulfur per 100 parts by weight of total polymer.

References Cited in the file of this patent

UNITED STATES PATENTS

| | | |
|---|---|---|
| 2,138,895 | Wiezevich | Dec. 6, 1938 |
| 2,203,873 | Mueller | June 11, 1940 |
| 2,213,423 | Wiezevich | Sept. 3, 1940 |
| 2,384,298 | Green | Sept. 4, 1945 |
| 2,392,847 | Frolich | Jan. 15, 1946 |

FOREIGN PATENTS

| | | |
|---|---|---|
| 642,050 | Great Britain | Aug. 23, 1950 |

OTHER REFERENCES

Schildknecht: Vinyl and Related Polymers, 1952, published by John Wiley & Sons, New York, pages 544 to 546.

Whitby: "Synthetic Rubber," John Wiley & Sons, New York (1954), page 24.